(12) United States Patent
DeFazio et al.

(10) Patent No.: US 10,101,877 B2
(45) Date of Patent: Oct. 16, 2018

(54) PORTABLE ELECTRONIC DEVICE INCLUDING TOUCH-SENSITIVE DISPLAY AND METHOD OF PROVIDING ACCESS TO AN APPLICATION

(71) Applicant: BlackBerry Limited, Waterloo (CA)

(72) Inventors: Michael Joseph DeFazio, Fonthill (CA); Tomasz Debicki, Toronto (CA); Shannon Tyler Moore, Ayr (CA)

(73) Assignee: BlackBerry Limited, Waterloo (CA)

( * ) Notice: Subject to any disclaimer, the term of this patent is extended or adjusted under 35 U.S.C. 154(b) by 306 days.

(21) Appl. No.: 14/688,913

(22) Filed: Apr. 16, 2015

(65) Prior Publication Data
US 2016/0306507 A1    Oct. 20, 2016

(51) Int. Cl.
| | |
|---|---|
| G06F 3/0482 | (2013.01) |
| G06F 3/0488 | (2013.01) |
| G06F 1/16 | (2006.01) |
| G06F 3/02 | (2006.01) |
| H04B 1/3827 | (2015.01) |
| G06F 3/0484 | (2013.01) |

(52) U.S. Cl.
CPC .......... *G06F 3/0482* (2013.01); *G06F 1/1624* (2013.01); *G06F 1/1662* (2013.01); *G06F 1/1677* (2013.01); *G06F 3/0227* (2013.01); *G06F 3/0488* (2013.01); *G06F 3/04842* (2013.01); *H04B 1/3827* (2013.01)

(58) Field of Classification Search
None
See application file for complete search history.

(56) References Cited

U.S. PATENT DOCUMENTS

| | | | |
|---|---|---|---|
| 2010/0001967 A1* | 1/2010 | Yoo | G06F 3/0488 |
| | | | 345/173 |
| 2010/0120478 A1 | 5/2010 | Nomura et al. | |
| 2010/0279657 A1 | 11/2010 | Matsuo | |
| 2012/0208501 A1* | 8/2012 | Tsuda | H04M 1/67 |
| | | | 455/411 |

(Continued)

FOREIGN PATENT DOCUMENTS

| | | |
|---|---|---|
| JP | 2013-30942 A | 2/2013 |
| JP | 5663711 B1 | 2/2015 |

OTHER PUBLICATIONS

Extended European Search Report (EESR) dated Aug. 3, 2016, issued in respect of corresponding EP patent application No. 16163997.6.

(Continued)

*Primary Examiner* — Stella Higgs
(74) *Attorney, Agent, or Firm* — Borden Ladner Gervais LLP; Geoffrey deKleine

(57) ABSTRACT

A method of providing access to an application from a portable electronic device is provided. The method includes detecting an event to provide a selectable option, identifying a selectable option associated with the event and providing the selectable options on a touch-sensitive display of the portable electronic device, and in response to detecting a touch associated with the selectable option on the touch-sensitive display and movement of a keyboard portion of the portable electronic device relative to the touch-sensitive display, performing a function associated with the selectable option.

7 Claims, 5 Drawing Sheets

(56) References Cited

U.S. PATENT DOCUMENTS

2012/0311499 A1* 12/2012 Dellinger ........... H04N 5/23206
715/835
2014/0057610 A1* 2/2014 Olincy .................... H04W 4/16
455/414.1
2014/0372896 A1* 12/2014 Raman .................. G06F 3/0488
715/741

OTHER PUBLICATIONS

Printout of "Introducing Cover", retrieved on Feb. 24, 2015 from http://blog.coverscreen.com/post/64965314790/introducing-cover.
Printout of "How to quickly reply to an iMessage using interactive notifications in iOS8", retrieved on Feb. 24, 2015 from http://www.imore.com/how-use-quick-reply-messaging-ios-8.
Printout of "How to decline a phone call with a custom text message on ICS", retrieved on Feb. 24, 2015 from http://www.cnet.com/how-to/how-to-decline-a-phone-call-with-a-custom-text-message-on-ics/.

* cited by examiner

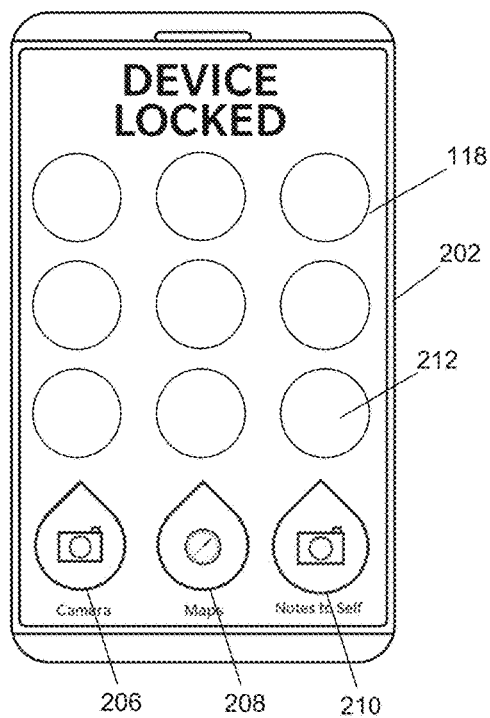
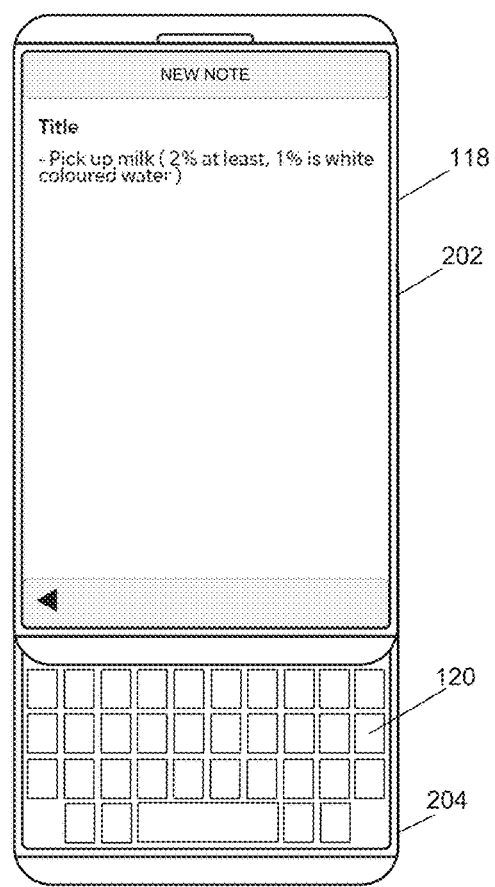
FIG. 2
FIG. 3

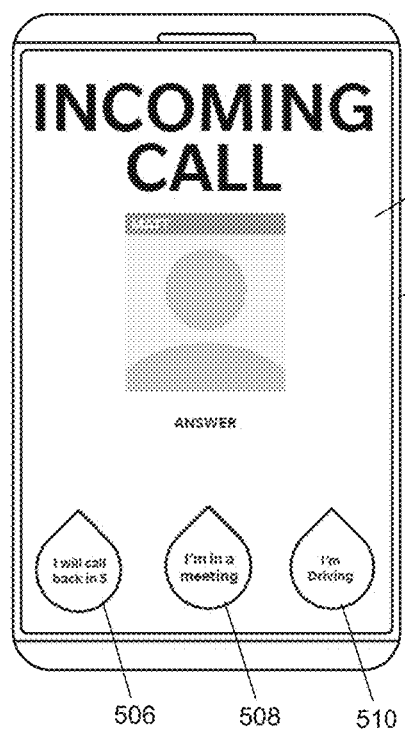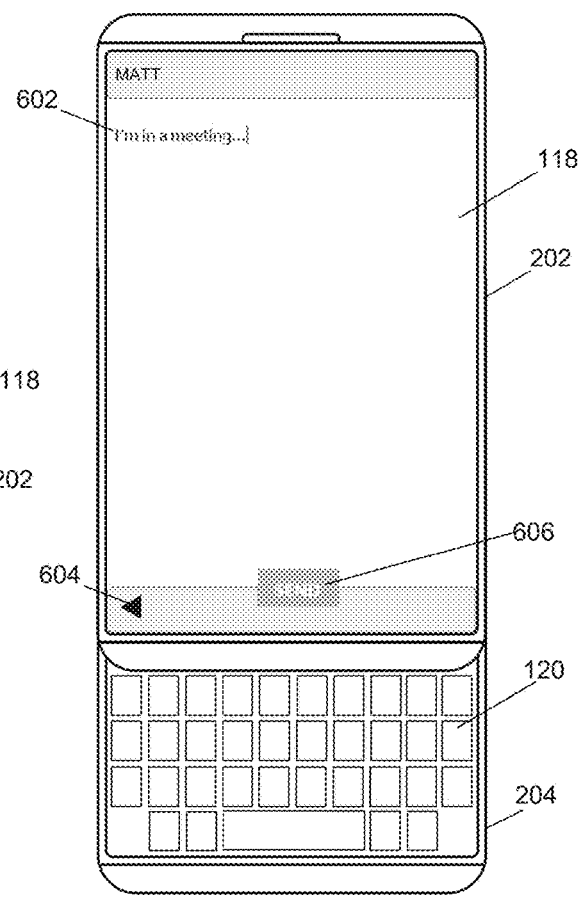
FIG. 5
FIG. 6

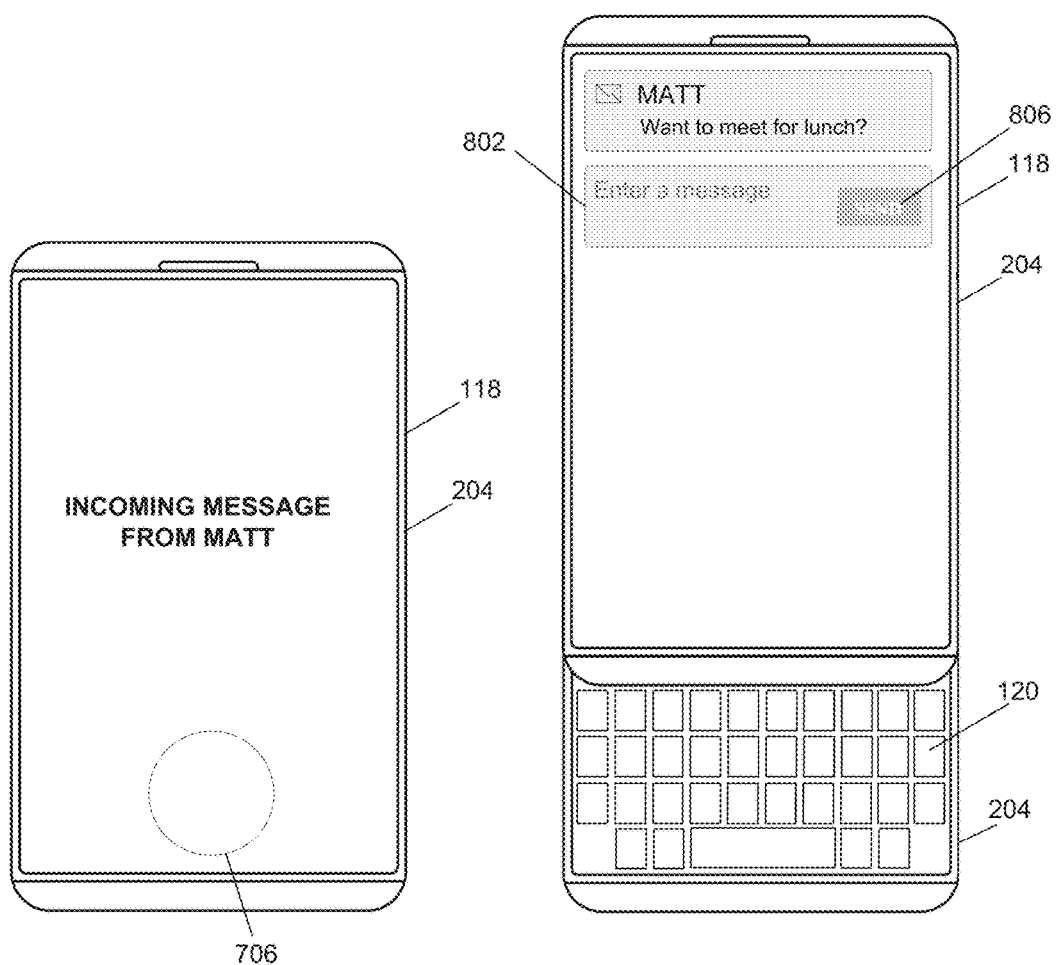

PORTABLE ELECTRONIC DEVICE INCLUDING TOUCH-SENSITIVE DISPLAY AND METHOD OF PROVIDING ACCESS TO AN APPLICATION

FIELD OF TECHNOLOGY

The present disclosure relates to portable electronic devices including touch-sensitive displays.

BACKGROUND

Portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, wireless PDAs, and laptop computers with wireless 802.11 or Bluetooth® capabilities.

Portable electronic devices such as PDAs or smart telephones are generally intended for handheld use and ease of portability. Small devices are generally desirable for portability. A touch-sensitive display, also known as a touchscreen display, is particularly useful on handheld devices, which have limited space for user input and output. The information displayed on the touch-sensitive displays may be modified depending on the functions and operations being performed.

Improvements in electronic devices, including portable electronic devices with touch-sensitive displays are desirable.

BRIEF DESCRIPTION OF THE DRAWINGS

Embodiments of the present disclosure will now be described, by way of example only, with reference to the attached figures, in which:

FIG. 2 is a front view of an example of a portable electronic device with a housing including a keyboard in a first position in accordance with the disclosure;

FIG. 3 is a front view of an example of a portable electronic device with the housing including the keyboard in a second, extended position in accordance with the disclosure;

FIG. 5 through FIG. 8 illustrate examples of the method of providing access to the application in accordance with the flowchart of FIG. 3.

DETAILED DESCRIPTION

Figure 1:
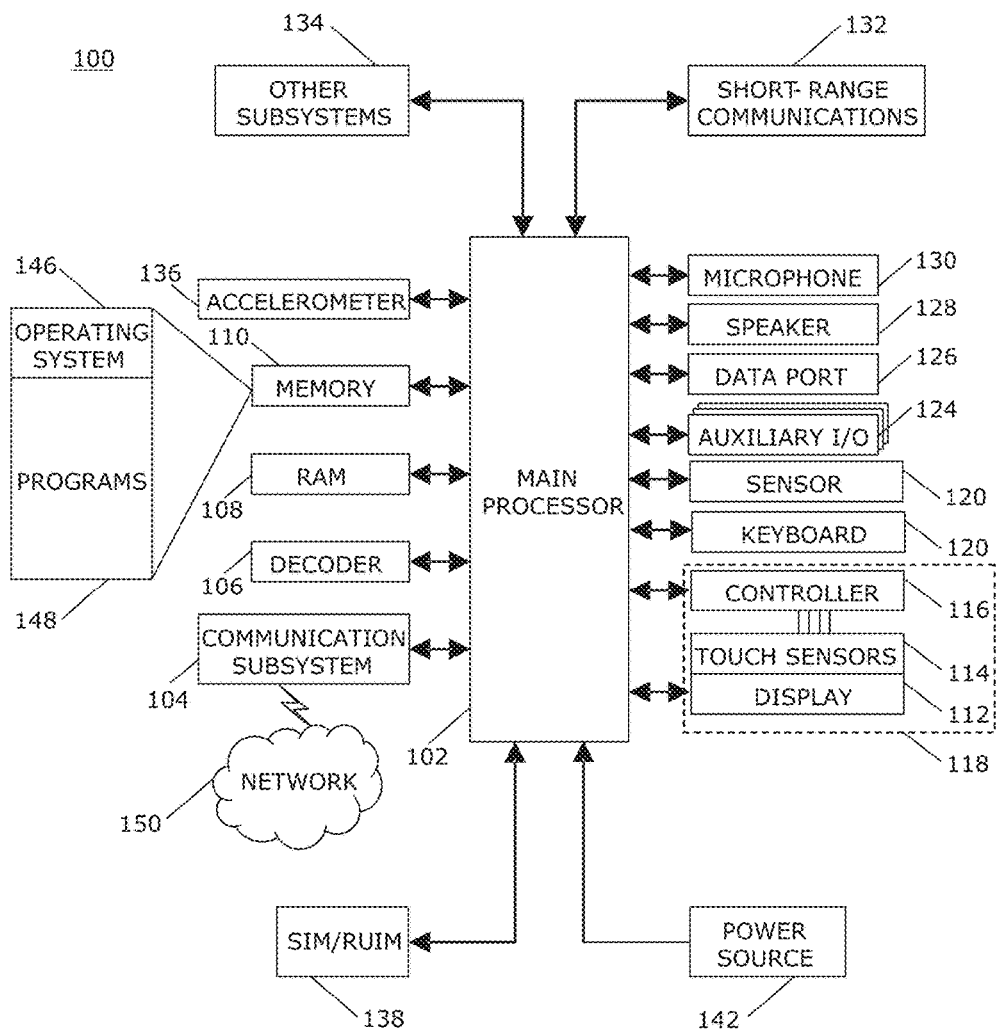
FIG. 1 is a block diagram of a portable electronic device in accordance with the present disclosure.

The following describes a portable electronic device and a method of providing access to an application from a portable electronic device. The method includes detecting an event to provide a selectable option, identifying a selectable option associated with the event and providing the selectable options on a touch-sensitive display of the portable electronic device, and in response to detecting a touch associated with the selectable option on the touch-sensitive display and movement of a keyboard portion of the portable electronic device relative to the touch-sensitive display, performing a function associated with the selectable option.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device as described herein. Examples of electronic devices include mobile, or handheld, wireless communication devices such as cellular phones, cellular smart-phones, wireless organizers, personal digital assistants, wirelessly enabled notebook computers, tablet computers, mobile internet devices, electronic navigation devices, and so forth.

A block diagram of an example of an electronic device, which in the present example is a portable electronic device, is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a keyboard 120, a housing sensor 122, an auxiliary input/output (I/O) subsystem 124, a data port 126, a speaker 128, a microphone 130, short-range communications 132 and other device subsystems 134. The speaker 128, also referred to as an earpiece speaker, is utilized to output audible signals when a user's ear is very close to the speaker 128. Although not shown, the processor may also interact with a loudspeaker, for example, for handsfree use.

The keyboard 120 includes a plurality of keys, which may be mechanical keys that include mechanical switches or contacts for input to the electronic device 100 when a mechanical key of the keyboard is depressed by a sufficient amount to oppose a bias of the mechanical key. Alternatively, or in addition, the keys of the keyboard may include touch sensors coupled to a controller to detect touch input thereon. The keyboard 120 may be any suitable keyboard such as a QWERTY, AZERTY, QWERTZ keyboard or any other suitable keyboard.

The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

As described below, a first housing of the portable electronic device 100 supports the touch-sensitive display 118 and the keyboard 120 is disposed in a second housing of the portable electronic device 100. In this example, the second housing is slideable relative to the first housing to move the second housing between a first position in which the keyboard is hidden by the first housing and a second position in which the keyboard is exposed. The housing sensor 122 is coupled to the processor 102 and is utilized to detect movement of the second housing relative to the first housing and to detect the position of the second housing relative to the first housing.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display that includes a plurality of capacitive touch sensors 114. Capacitive touch sensors 114 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern. The drive electrodes are spaced from the sense electrodes by a dielectric material. The points at which the drive electrodes and the sense electrodes cross each other are referred to as nodes. The drive and sense electrodes may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

By repeatedly scanning the electrodes of the touch-sensitive display 118 to detect touches, movement of a touch relative to the touch-sensitive display 118 may be detected. One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The touch-sensitive display 118 includes a display area in which information may be displayed, and a non-display area extending around the periphery of the display area. Information is not displayed in the non-display area by the display. The non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed in the non-display area. Touch sensors including drive electrodes and sense electrodes may be disposed in the non-display area, which touch sensors may be extended from the touch sensors in the display area or may be distinct or separate touch sensors from the touch sensors in the display area. A touch, including a gesture, may be associated with, i.e., performed on, the display area, the non-display area, or both areas. The touch sensors including the drive electrodes and the sense electrodes may extend across substantially the entire non-display area or may be disposed in only part of the non-display area.

An example of an electronic device 100 is shown in FIG. 2 and FIG. 3. The electronic device 100 includes a first housing 202 that supports the touch-sensitive display 118. The touch-sensitive display 118 may be disposed in or on the first housing 202. The electronic device 100 also includes a second housing 204 in which the keyboard 120 is disposed. The second housing 204 is slideable relative to the first housing 202 such that the second housing 204 can be moved relative to the first housing 202, between a first position, shown in FIG. 2, in which the first housing 202 is stacked on the second housing 204 and the keyboard 120 is hidden by the first housing 202, and a second position, shown in FIG. 3, in which the keyboard 120 is exposed for use for input to the processor 102. The first housing 202 and the second housing 204 together are utilized to enclose components such as the components shown in FIG. 1. As indicated above, the housing sensor 122 (shown in FIG. 1) is utilized to detect the position of the second housing 204 relative to the first housing 202.

The movement of the housings 202, 204 is a relative movement and therefore may be described as being movement of the first housing 202 relative to the second housing 204 or as movement of the second housing 204 relative to the first housing 202. Movement may be effected, for example, by a user holding the second housing 204 while applying a force to the first housing 202. For example, the user may hold the second housing 204 in one hand while utilizing the thumb of the same hand to touch the touch-sensitive display 118 of the portable electronic device 100 and, apply sufficient friction force to the touch-sensitive display 118 to slide the first housing 202 relative to the second housing 204, thereby moving the second housing 204 relative to the first, to the second position shown in FIG. 3.

For the purpose of the example of FIG. 2, information is displayed on the touch-sensitive display 118. The information in this example is an indication that the electronic device 100 is in a locked state in which access to applications and data stored on the electronic device 100 is restricted. The electronic device 100 may be unlocked, also referred to as entry into an unlocked state, in response to, for example, receipt of an input or combination of input such as one or more of a password or passcode, a gesture on the touch-sensitive display 118, a biometric identifier such as a fingerprint, voice identification, hand geometry, or any other suitable identifier.

The information also includes selectable options 206, 208, 210 that are selectable to perform functions of the electronic device 100 while the electronic device 100 is in a locked state. In the example of FIG. 2, the selectable options are options to launch applications and include a camera option 206 to launch the camera application, a maps option 208 to launch a map application, and a notes option 210 to launch a notes application. The functions that are available when any one of the applications is launched while the electronic device 100 is in the locked state may be restricted such that fewer functions are available compared to the functions available when the same application is launched when the electronic device 100 is in the unlocked state. For example, when the notes application is launched while the electronic device 100 is in the locked state, new notes may be added but previously entered notes may not be accessible such that an unauthorized user is unable to view previously entered notes.

The information may also include other information such as virtual buttons 212 for entry of a passcode to unlock the electronic device 100.

Figure 4:
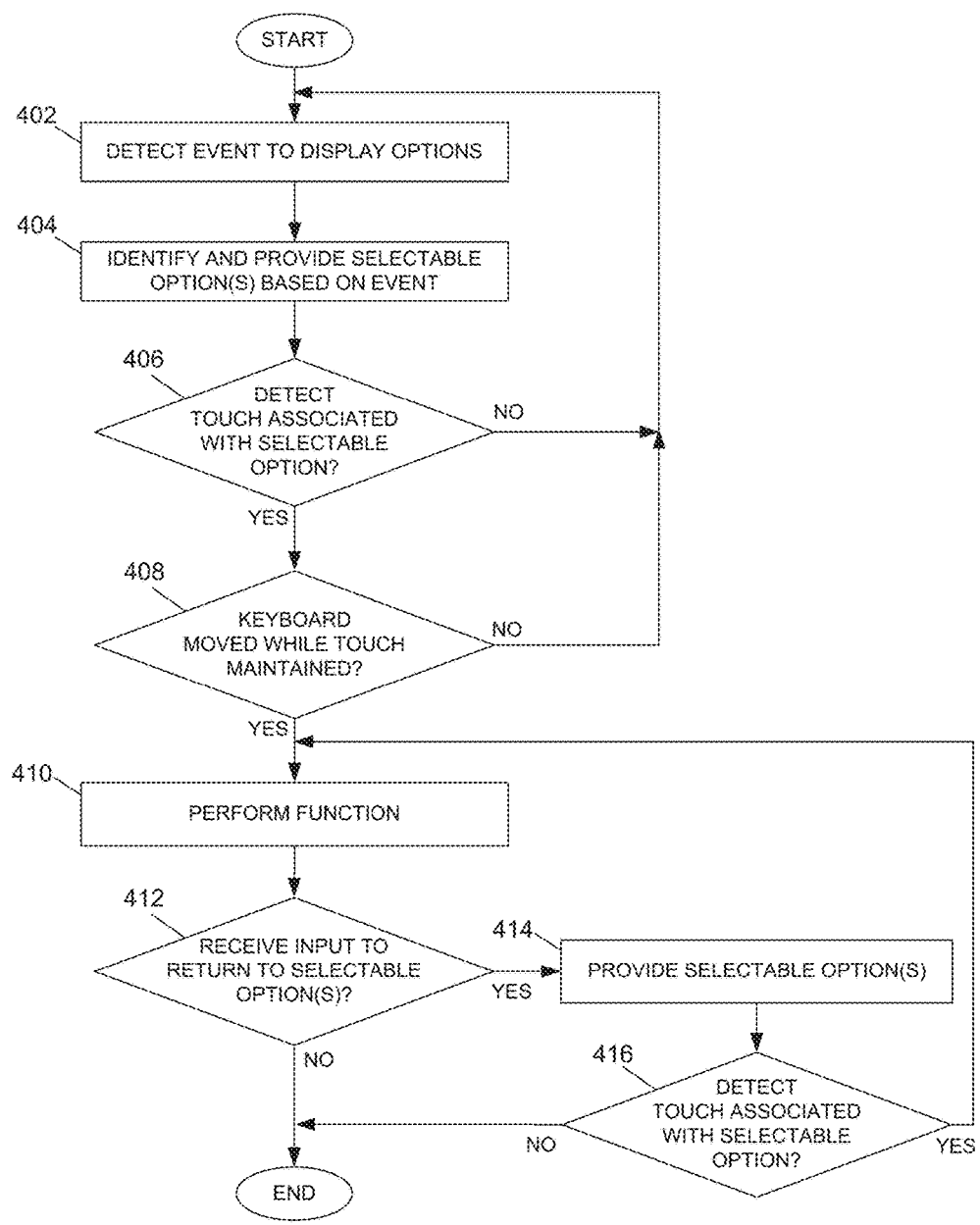
FIG. 4 is a flowchart illustrating a method of providing access to an application in accordance with the present disclosure.

A flowchart illustrating a method of providing access to an application on a portable electronic device, such as the portable electronic device 100, is shown in FIG. 4. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor, such as the processor 102, of the portable electronic device to perform the method may be stored in a computer-readable storage medium, such as a non-transitory computer-readable medium.

An event is detected at 402 while the second housing 204 is in the first position in which the keyboard 120 is hidden by the first housing 202. The event is an event to display options. The event may be detected when portable electronic device 100 is in a locked state. The event may be, for example, receipt of an input to display information from a low-power condition of the touch-sensitive display 118 while the portable electronic device 100 is in a locked state. The low-power condition may be a condition in which no information is displayed on the touch-sensitive display 118.

Referring to the example of the portable electronic device 100 in the locked state, the portable electronic device 100 may enter a locked state and a low-power condition in any suitable manner. For example, the portable electronic device 100 may enter the locked state and the low-power condition automatically after a predetermined period of time has passed without receipt of any input from the touch-sensitive display 118 while the second housing 204 is in the first position in which the keyboard 120 is hidden. Alternatively, the portable electronic device 100 may enter a locked state and a low-power condition in response to an input such as receipt of a selection of an option to lock the portable electronic device 100. The portable electronic device 100 may also enter the locked state separately of entry into the low-power condition. For example, the portable electronic device 100 may enter the low-power condition by discontinuing displaying information on the display 112 after a first predetermined period of time has passed without receipt of an input from the touch-sensitive display 118. The portable electronic device 100 may enter the locked state after a second predetermined period of time has passed without receipt of an input such that the second predetermined period of time is longer than the first predetermined period of time. According to another alternative, the portable electronic device 100 may enter the locked state or may enter the low-power condition or both in response to detecting movement of the second housing 204 relative to the first housing 202, from the second, extended position to the first position in which the keyboard 120 is hidden by the first housing.

The input may be an input to "wake up" or power up the display 112 to display information on the display 112 in a normal power condition. Any suitable input may be utilized to power up the display 112. For example, the input may include detection of a gesture on the touch-sensitive display 118, input resulting from depression of a button or buttons on the portable electronic device 100, or any other suitable input.

The event to display options on the portable electronic device 100 may alternatively be an incoming phone call such as a cellular phone call, or an internet based voice over internet protocol (VOIP) call. The event may also be receipt of a message such as an email message, a text message, or other messaging service.

In response to detecting the event, a selectable option or selectable options associated with the event are identified and provided at 404. The selectable option or options may be provided by displaying the options on the touch-sensitive display 118. Alternatively, a selectable option may be provided on the touch-sensitive display 118 without displaying the option by associating an area on the touch-sensitive display with the option without displaying information associated with the option. The selectable option or options are associated with the event such that the selectable options that are provided are dependent on the event. The selectable option or options may also be dependent on other factors such as calendared events scheduled at the time of the event, or location of the portable electronic device 100 at the time of the event. The identified selectable option or options may be associated with the event, for example, by user selection of the selectable option or options from a menu-list of options. Thus, a user may select from options relating to any suitable application on the portable electronic device 100.

Optionally, instructions to perform a function may be displayed by providing instructions to touch a location on the touch-sensitive display, such as a location at which a selectable option is displayed, and move the second housing 204 relative to the first housing 202. The instructions may include text instructions or figures or pictures or may be combination of text and figures or pictures.

A determination is made whether a touch associated with a selectable option is detected utilizing the touch-sensitive display 118. A touch is associated with a selectable option when the touch is detected on or near the area of the touch-sensitive display 118 that is associated with the selectable option. In response to detecting a touch associated with a selectable option on the touch-sensitive display at 406, the method continues at 408.

A determination is made at 408 whether the second housing 204 is moved relative to the first housing 202. Optionally, the second housing 204 may be moved to the second position as shown in FIG. 2, thereby moving the keyboard 120 of the portable electronic device 100 relative to the touch-sensitive display 118, to expose the keyboard 120. Alternatively, the second housing 204 may be moved relative to the first housing 202 without fully exposing the keyboard 120. For example, the keyboard 120 may be only partially exposed by moving the second housing 204 relative to the first housing 202 by less than a threshold amount such that the keyboard 120 less than half the keyboard 120 is exposed. The second housing 204 may slide back into the first position after partially exposing the keyboard 120.

If no movement of the second housing 204 relative to the first housing 202 is detected such that the touch is detected at 406 without detecting sliding of second housing 204 relative to the first housing 202, the portable electronic device may return to 402.

In response to determining that the second housing 204 is moved relative to the first housing 202 such that the keyboard 120 is moved relative to the touch-sensitive display 118 while the touch is maintained at the location associated with the selectable option, the method continues at 410.

The function associated with the selectable option at which the touch is detected at 406 is performed at 410. Thus, the function is performed in response to detecting the touch associated with the selectable option while moving the second housing 204 relative to the touch-sensitive display 118. When the portable electronic device 100 is in the locked state, the function may be performed while the portable electronic device 100 remains in the locked state. The function may include, for example, launching an application, composing a message, or responding to a message. As indicated, the functions that are available as a result of launching an application at 410 may be restricted such that fewer functions are available compared to the functions available when the same application is launched while the portable electronic device 100 is in the unlocked state.

Optionally, after performing the function, a selectable option or input may be provided to again display the selectable options. For example, an option such as a back button or arrow may be displayed on the touch-sensitive display 118 and may be selected in response to detecting a touch on or near the button or arrow. In response to receipt of the input to go back to providing the selectable option or options at 412, the method continues at 414 and the selectable option or options are again provided on the touch-sensitive display. Thus, the portable electronic device 100 may exit the application and provide the selectable option or options again.

In response to detecting selection of a selectable option at 416, the method continues at 410 and the associated function is performed. The selectable option in this case is selected by a touch on or near the area associated with the selectable option on the touch-sensitive display 118. Optionally, a touch on the area associated with the selectable option on the touch-sensitive display 118 launches the application because the second housing 204 is already in the second position in which the keyboard 120 is fully exposed.

Reference is made to FIG. 2 and FIG. 3 with continued reference to FIG. 4 to describe an example of the method of providing access to an application. For the purpose of the example shown in FIG. 2, and FIG. 3, the portable electronic device 100 is in a locked state, the display 112 is in a low-power condition, and the second housing 204 is in the first position, as illustrated in FIG. 2. An event is detected at 402. The event is an input to "wake up" or power up the display 112 to display information on the display 112 in a normal power condition. As indicated above, the input may be any suitable input such as detection of a gesture on the touch-sensitive display 118.

In response to detecting the event, the selectable options associated with the event are identified and displayed on the touch-sensitive display 118 at 404. The selectable options include the camera option 206 to launch the camera application, the maps option 208 to launch a map application, and the notes option 210 to launch a notes application.

A touch associated with the notes option 210 is detected at 406 and, utilizing the housing sensor 122, movement of the second housing 204 relative to the first housing 202, thereby exposing the keyboard 120, is detected at 408.

In response to detecting the touch on the selectable notes option 210 and detecting that the second housing 204 is moved relative to the first housing 202 while the touch is maintained on the selectable notes option 210, the Notes application is launched at 410, as shown in FIG. 3.

As indicated above, the application is launched in response to detecting the touch associated with the selectable option while sliding the second housing 204 relative to the touch-sensitive display 118. Thus, the touch and the movement, which in this example is sliding of the second housing 204 relative to the first housing 202, may occur utilizing a single interaction with the portable electronic device 100 in which, for example, a thumb touches on the selectable notes option 210 and presses with sufficient force while moving the thumb upwardly in the orientation illustrated in FIG. 2 to cause the second housing 204 to move relative to the first housing 202 to expose the keyboard 120 as shown in FIG. 3. Thus, a single interaction is utilized to perform the function, which in this example is launching an application. Additional touches or gestures are not required to perform the function. The single interaction results in touch detection by the touch-sensitive display 118 and detection of movement of the second housing 204 relative to the first housing 202. By performing the function in response to both detecting the touch at a specific location associated with the application and detecting movement of the second housing 204 relative to the first housing 202, the chance of performing a function inadvertently, such as inadvertent launching of an application or sending of a message is reduced without additional steps such as additional touches or gestures required as confirmation.

In the present example, the notes application is launched and new note composition screen 302 is displayed on the touch-sensitive display 118, as illustrated in FIG. 3. The new note may be composed by the user and saved utilizing the notes application without unlocking the portable electronic device 100.

A selectable back arrow 304 is also displayed on the touch-sensitive display 118. The back arrow 304 is selectable to exit the notes application and again display the selectable options 206, 208, 210.

Reference is now made to FIG. 5 and FIG. 6 with continued reference to FIG. 4 to describe another example of the method of providing access to an application. For the purpose of the example shown in FIG. 5, and FIG. 6, the portable electronic device 100 is in a locked state, the display 112 is in a low-power condition, and the second housing 204 is in the first position, as illustrated in FIG. 5. An event is detected at 402. The event is receipt of an incoming telephone call.

In response to detecting the event, the selectable options associated with the event are identified and displayed on the touch-sensitive display 118 at 404. The selectable options include three options to send messages to the originator of the telephone call. The messages may be sent, for example, as text messages. Alternatively, the messages may be sent utilizing any other suitable messaging application. The messages may, for example, be sent utilizing other messaging applications depending on the information stored in an address book or contacts application in association with the originator of the call. The selectable options in this example include a message indicating "I will call back in 5" 506, a message indicating "I'm in a meeting" 508, and a message indicating "I'm driving" 510.

A touch associated with the "I'm in a meeting" option 508 is detected at 406 and, utilizing the housing sensor 122, movement of the second housing 204 relative to the first housing 202 is detected at 408.

In response to detecting the touch on the "I'm in a meeting" option 508 and detecting that the second housing 204 is moved relative to the first housing 202 while the touch is maintained on the selectable notes option 210, the function is performed at 410 by launching the messaging application, as shown in FIG. 6.

As indicated above, the application is launched in response to detecting the touch associated with the selectable option while sliding the second housing 204 relative to the touch-sensitive display 118. Thus, the touch and the sliding of the second housing 204 relative to the first housing 202 may occur utilizing a single interaction with the portable electronic device 100.

In the present example, the text message application is launched and new text composition screen 602 is displayed on the touch-sensitive display 118, as illustrated in FIG. 6. The message "I'm in a meeting . . . " is automatically composed without unlocking the portable electronic device 100. The user may add to the automatically composed message, delete the automatically composed message, or edit the automatically composed message.

A selectable "SEND" option 606 is also displayed by the message application and is selectable by, for example, a touch at or near the "SEND" option 606 on the touch-sensitive display 118. Selection of "SEND" option 606 sends the message to the recipient, which is the originator of the telephone call.

A selectable back arrow 604 is also displayed on the touch-sensitive display 118. The back arrow 604 is selectable to exit the message application and again display the selectable options 506, 508, 510.

Referring now to FIG. 7 and FIG. 8 with continued reference to FIG. 4, yet another example of the a method of providing access to an application is shown. For the purpose of the example shown in FIG. 7, and FIG. 8, the portable electronic device 100 is in a low-power condition, and the second housing 204 is in the first position, as illustrated in FIG. 5. An event is detected at 402. The event is receipt of an incoming message.

In response to detecting receipt of the incoming message, a selectable option associated with the event is identified and provided on the touch-sensitive display 118 at 404. In this example only one selectable option is identified and provided. The selectable option may be displayed as illustrated. Alternatively, the selectable option may be associated with an area such as the area identified by the circle in FIG. 7, without displaying the circle or other information. The selectable option is an option to respond to the incoming message 706. Optionally, the incoming message may also be displayed as a pop-up notification or a toast message.

A touch associated with the respond to the incoming message option 706 is detected at 406 and, utilizing the housing sensor 122, movement of the second housing 204 relative to the first housing 202, thereby exposing the keyboard 120, is detected at 408.

In response to detecting the touch on the respond to the incoming message option 706 and detecting that the second housing 204 is moved relative to the first housing 202 while the touch is maintained on the option, the function is performed at 410 by launching the messaging application, as shown in FIG. 8.

As indicated above, the application is launched in response to detecting the touch associated with the selectable option while moving the second housing 204 relative to the touch-sensitive display 118. Thus, the touch and the sliding of the second housing 204 relative to the first housing 202 may occur utilizing a single interaction with the portable electronic device 100.

In the present example, the message application associated with the pop-up message is launched and a message composition field 802 is displayed on the touch-sensitive display 118, as illustrated in FIG. 8. The user may compose a response and the message recipient is the sender of the original message received at 402.

A selectable "SEND" option 806 is also displayed by the message application and is selectable by, for example, a touch at or near the "SEND" option 806 on the touch-sensitive display 118. Selection of the "SEND" option 806 sends the message to the recipient.

In this example, a selectable back arrow is not provided as no option to return to the selectable option is provided.

Advantageously, a single interaction is utilized to perform a function, such as launching an application from an electronic device when the electronic device is in the locked state. The touch input is therefore confirmed by the motion of the second housing relative to the first housing and additional touches or gestures are not required to perform the function. The single interaction results in touch detection by the touch-sensitive display and detection of movement of the second housing relative to the first housing. By performing the function in response to both detecting the touch at a specific location associated with the application and detecting movement, such as sliding, of the second housing relative to the first housing, the chance of performing a function inadvertently, such as inadvertent launching of an application or sending of a message is reduced without additional steps such as additional touches or gestures required as confirmation.

The scope of the claims should not be limited by the preferred embodiments set forth in the examples, but should be given the broadest interpretation consistent with the description as a whole.

What is claimed is:

1. A method of providing access to an application from a portable electronic device, while the portable electronic device is in a locked state, the method comprising:

detecting receipt of a message or receipt of an incoming phone call;

in response to receipt of the message or receipt of the incoming phone call while the portable electronic device is in the locked state, identifying a selectable option for responding to receipt of the message or receipt of the phone call and providing the selectable option on a touch-sensitive display of the portable electronic device;

detecting a touch associated with the selectable option on the touch-sensitive display of the portable electronic device;

detecting movement of a keyboard portion of the portable electronic device relative to the touch-sensitive display;

in response to detecting movement of the keyboard portion of the portable electronic device relative to the touch-sensitive display while the touch is maintained on the selectable option on the touch-sensitive display:

launching an application associated with the selectable option for responding to receipt of the message or receipt of the phone call while the portable electronic device remains in the locked state, automatically composing a response to the receipt of the message or incoming phone call based on the selectable option and providing the response for editing prior to sending; and in response to receipt of a selection of a send command, sending the response;

in response to detecting movement of the keyboard portion of the portable electronic device absent the touch, awaiting receipt of a further message or receipt of a further incoming phone call without launching the application associated the selectable option and without automatically composing the response, such that no function is performed in association with the movement of the keyboard and no function is performed in association with the touch;

wherein fewer functions for the application are available in response to launching the application when the portable electronic device is in the locked state compared to the functions available in response to launching the application when the portable electronic device is in an unlocked state.

2. The method according to claim 1, wherein, in response to receipt of an input to return to providing the selectable option after launching the application, again providing the selectable option on the touch-sensitive display of the portable electronic device.

3. The method according to claim 1, wherein a plurality of selectable options are provided, including the selectable option, by displaying the plurality of selectable options on the touch-sensitive display.

4. A non-transitory computer-readable medium having computer-readable code stored thereon, the computer-readable code executable by at least one processor of a portable electronic device to perform the method according to claim 1.

5. A portable electronic device comprising:
a first housing;
a touch-sensitive display supported by the first housing;
a second housing coupled to the first housing and moveable relative thereto to between a first position in which the first housing is stacked with the second housing and a second, extended position;
a keyboard disposed in the second housing and hidden by the first housing when the second housing is in the first position and exposed for use when the second housing is in the second, extended position;
a processor operably coupled to the touch-sensitive display and to the keyboard and configured to control the touch-sensitive display to:
enter a locked state;
while in the locked state, detect receipt of a message or receipt of an incoming phone call when the second housing is in the first position;
in response to receipt of the message or receipt of the incoming phone call while the portable electronic device is in the locked state, identify a selectable option for responding to receipt of the message or receipt of the phone call and provide the selectable option on the touch-sensitive display;
detect a touch associated with the selectable option on the touch-sensitive display of the portable electronic device;
detect movement of a keyboard portion of the portable electronic device relative to the touch-sensitive display;
in response to detecting movement of the second housing relative to the first housing while the touch is maintained on the selectable option on the touch-sensitive display:
launch an application associated with the selectable option for responding to receipt of the message or receipt of the phone call while the portable electronic device remains in the locked state,
automatically compose a response to the receipt of the message or incoming phone call based on the selectable option and provide the response for editing prior to sending; and
in response to receipt of a selection of a send command, send the response;
in response to detecting movement of the keyboard portion of the portable electronic device absent the touch, await receipt of a further message or receipt of a further incoming phone call without launching the application associated the selectable option and without automatically composing the response, such that no function is performed in association with the movement of the keyboard and no function is performed in association with the touch;
wherein fewer functions for the application are available in response to launching the application when the portable electronic device is in the locked state compared to the functions available in response to launching the application when the portable electronic device is in an unlocked state.

6. The portable electronic device to claim 5, wherein a plurality of selectable options are provided, including the selectable option, by displaying the plurality of selectable options on the touch-sensitive display.

7. The portable electronic device according to claim 5, wherein, in response to receipt of an input to return to providing the selectable option after launching the application associated with the selectable option, the selectable option is provided again on the touch-sensitive display of the portable electronic device.

* * * * *